C. NELSON.
CULINARY ARTICLE.
APPLICATION FILED SEPT. 8, 1909.
1,096,456.
Patented May 12, 1914.
2 SHEETS—SHEET 1.
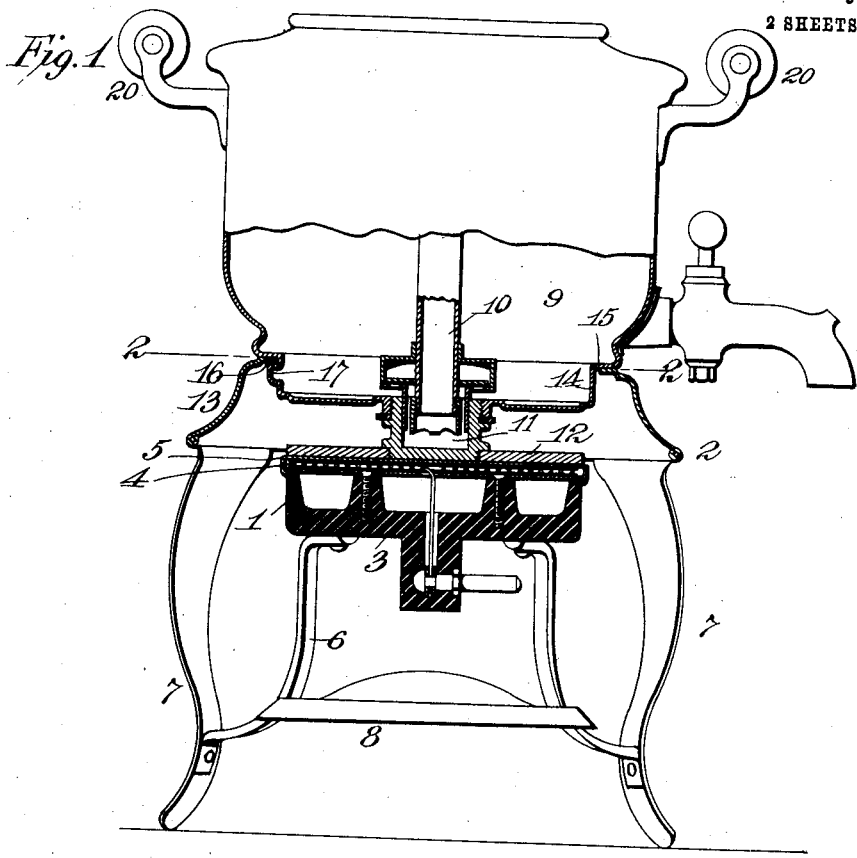
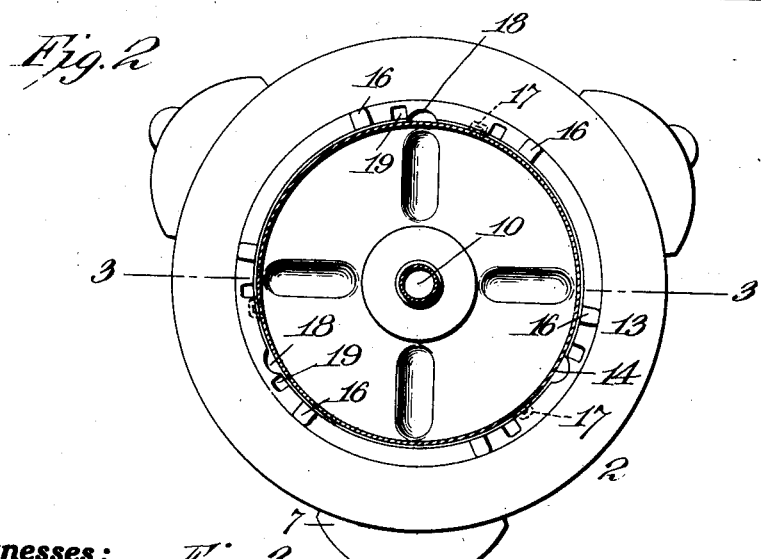
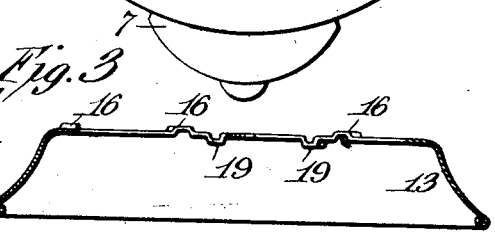
Witnesses:
John Fotch
P. T. Ward
Inventor
Charles Nelson
By Dyer & Dyer
Attorneys.

C. NELSON.
CULINARY ARTICLE.
APPLICATION FILED SEPT. 8, 1909.
1,096,456.
Patented May 12, 1914.
2 SHEETS—SHEET 2.
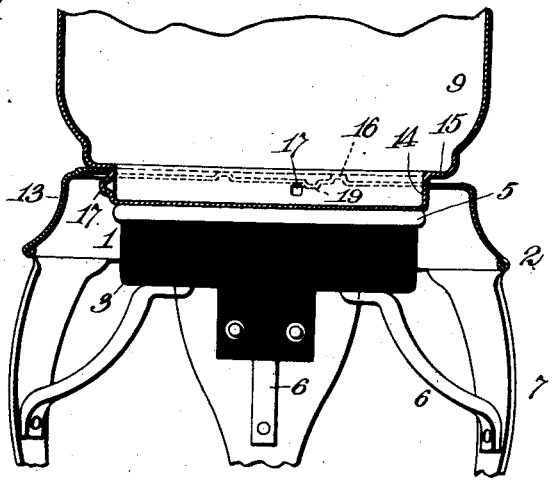
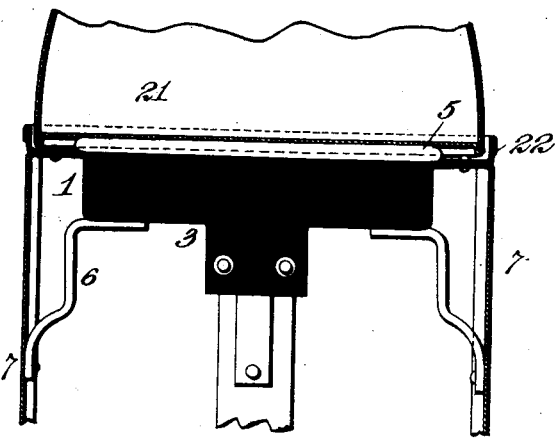
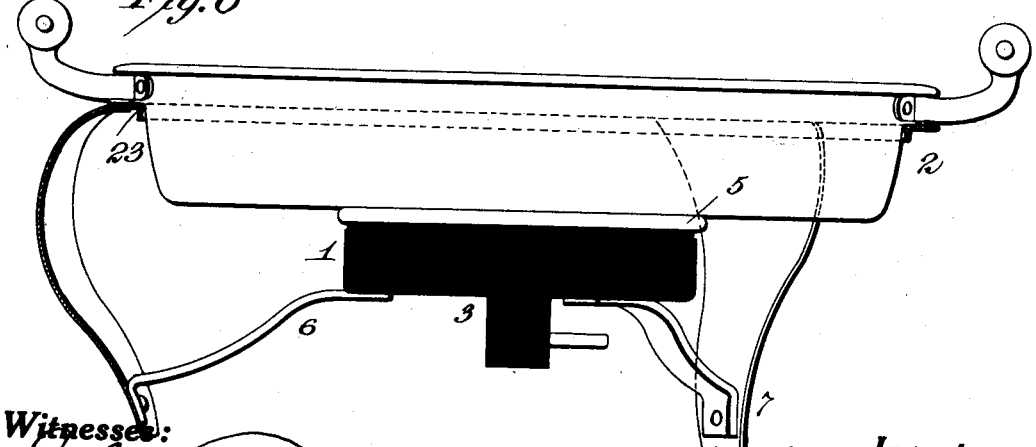
Inventor
Charles Nelson

UNITED STATES PATENT OFFICE.

CHARLES NELSON, OF BROOKLYN, NEW YORK, ASSIGNOR TO S. STERNAU & CO., OF BROOKLYN, NEW YORK, A COPARTNERSHIP COMPOSED OF SIGMUND STERNAU AND LIONEL STRASSBURGER.

CULINARY ARTICLE.

1,096,456.    Specification of Letters Patent.    Patented May 12, 1914.

Application filed September 8, 1909. Serial No. 516,640.

*To all whom it may concern:*

Be it known that I, CHARLES NELSON, a citizen of the United States, residing in the borough of Brooklyn, city of New York, county of Kings, State of New York, have invented a certain new and useful Culinary Article, of which the following is a specification.

The object I have in view is the production of an electrical attachment for culinary articles, such as coffee machines, tea kettles, chafing dishes, etc.

One of the objects of my invention is to produce such an attachment for existing devices which employ spirit lamps for heating the contents of the receptacle.

Another object is to produce a device in which radiation losses will be reduced, and the efficiency will thereby be increased.

A still further object is to produce a device in which the heating apparatus will be thermally insulated so that the stand will be kept relatively cool.

These and further objects will appear from the following specification and accompanying drawings, considered together or separately.

In the drawings: Figure 1 is a view partly in section of a portion of a coffee machine and stand, showing one embodiment of my invention. Fig. 2 is a sectional view on the line 2—2 of Fig. 1, looking downward. Fig. 3 is a sectional view on the line 3—3 of Fig. 2, taken through the annulus of the stand.
Fig. 4 is a fragmentary view of a modified embodiment of the invention, showing a different kind of coffee machine in place. Fig. 5 is a fragmentary view of my invention, showing an embodiment of the invention as applied to a tea kettle, and Fig. 6 is a similar view, showing the invention applied to a chafing dish.

In all of the views, like parts are designated by the same reference characters.

In carrying out my invention, an electrical heating unit 1 is attached permanently to the stand 2. The unit chosen for illustration is of the type which employs a body 3 of insulating material, a resistance coil 4 and a metal plate 5 which covers the coil and forms the radiating surface. This form of resistance unit is well known and forms no portion of the present invention. The unit is attached to the stand by means of flexible arms 6, which arms are secured to the legs 7 of the stand 2. A plate 8 is secured to the legs at an intermediate point which produces a light, rigid, cheap and handsome support for the unit. The plate 8 may be omitted,—such an arrangement being shown in Figs. 4, 5 and 6. A culinary vessel is adapted to be supported by the stand and rest upon the unit, the portion to be heated resting upon and in close contact with the metal plate 5 of the unit. The manner in which this is carried out depends to some extent upon the character of the vessel. I will first describe the details of arrangement in connection with a particular form of coffee machine.

Reference being had to Figs. 1, 2 and 3, the coffee machine in the first view is of the type employing a receptacle 9, a fountain 10, and a small heating chamber 11 with a heating plate 12 thereon. This form of coffee machine is illustrated in my copending application for patent, filed October 30th, 1907, Serial No. 399,804. The heating plate 12, which is attached to the bottom of the small heating chamber 11, is preferably substantially the same size as the metal plate 5 of the unit 1. Both plates are flat upon their engaging surfaces so that there is no loss from heat radiation. The two plates are held together, partly by the weight of the culinary vessel and the flexibility of the arms holding the heat unit, and partly by means of a spring clamp which I will now describe. This clamp is made up of members carried by the receptacle 9 and also members carried by the annulus 13,— by members carried by the uppermost member of the stand. The receptacle 9 is provided with a reduced portion 14, the rest of the receptacle being wider, the portion connecting the stand and receptacle forming a shoulder 15. The reduced portion 14 is slightly smaller than the opening in the center of the annulus 13. The shoulder 15 is larger than the opening, so that the shoulder can rest upon the annulus. The upper face of the annulus is provided with a plurality of bosses 16, as shown in Fig. 3. These bosses may be made by striking up the material of which the annulus is made. The shoulder 15 rests upon these bosses. This produces openings between the shoulder, the top of the annulus and the sides of the bosses. Through these openings the heated air will pass upward while the bosses themselves, producing a small amount of contact surface, will thermally insulate the stand from the receptacle and will keep the former cool.

The particular locking device for the receptacle and stand comprises protuberances 17 on the reduced portion 14 of the receptacle. These protuberances 17 may be struck out of the material of which the receptacle is made. The diameter of these protuberances is greater than the internal diameter of the annulus; therefore, when the protuberances are caused to engage below the inner edge of the annulus, the receptacle will be locked to the stand. For the purpose of permitting the protuberances to be introduced below the lower edge of the annulus, the latter is provided with notches 18 slightly larger than the bosses but the same in number and located on the same portions of the annulus that correspond with the bosses. The stand and receptacle may be secured together by introducing the reduced portion 14 within the annulus, passing the protuberances 17 through the notches 18 and then giving the receptacle a partial turn upon the annulus. For the purpose of limiting the turning movement of the receptacle upon the annulus, depending bosses 19 may be produced upon the annulus, such bosses being engaged by the protuberances 17 when the receptacle is rotated to the proper extent to be locked to the stand.

I prefer to make the annulus 13 of elastic material, such as spring brass, and I so proportion the parts that the heating plate 12 will be engaged with the metal plate 5, while the upper face of the annulus 13 is slightly distorted or pressed out of its normal position by the engagement of the protuberances with its under side. The elasticity of the metal by its reflex action will tend to force the flange toward the plate 5, thus causing intimate, elastic engagement between the plates 5 and 12. I therefore have, in addition to the weight of the receptacle and the flexible arms holding the heat unit, the elasticity of the annulus 13 for holding the plates 12 and 5 in contact. The locking device described also serves as the means for preventing the receptacle being accidentally knocked off the stand. It also provides means for lifting the stand and unit by means of handles 20 of the receptacle.

Fig. 4 illustrates means for securing a coffee machine of a different type to a stand, and in this embodiment of the invention precisely the same locking means is employed,— the difference in the structure being that the unit is somewhat higher in its position on the stand than in the structure illustrated in Fig. 1. As already stated, in this modification of the invention the plate 8 is not used.

Fig. 5 illustrates an embodiment of the invention as applied to a tea kettle. The kettle 21 is supported entirely by engagement with the unit 1. The stand is provided with a raised rim 22. This rim I prefer to make larger than the outside of the bottom of the kettle. This produces a passage for circulation of heated air and prevents direct contact between the stand and the kettle so that the legs of the stand are thermally insulated from the unit.

Fig. 6 represents an embodiment of the invention as applied to a chafing dish. In this embodiment of the invention the dish is shown as engaging with a ring 23. I prefer to so arrange the unit however that the weight of the dish is practically sustained by engagement with the unit. The ring 23 simply serves the purpose of holding the dish in place and prevents its being upset when the contents of the dish are being stirred.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

In a culinary article, a vessel, a stand therefor, said stand comprising legs and a ring surrounding a portion of the vessel, an electric unit, flexible arms connecting the unit to the legs, and means on the ring for forcing the vessel against the electric unit so as to distort the flexible arms and make an elastic contact between the vessel and the electric unit.

This specification signed and witnessed this 27th day of August, 1909.

CHARLES NELSON.

Witnesses:
LEONARD HUYLER,
JOHN L. LOTSCH.